United States Patent [19]

Koller et al.

[11] Patent Number: 4,770,861
[45] Date of Patent: Sep. 13, 1988

[54] RECOVERY OF CESIUM CHLORIDE FROM CONTAMINATED SOLUTIONS

[75] Inventors: Klaus-Peter Koller, Bad Soden am Taunus; Wilfried Schwab, Wiesbaden, both of Fed. Rep. of Germany

[73] Assignee: Hoechst Aktiengesellschaft, Fed. Rep. of Germany

[21] Appl. No.: 13,122

[22] Filed: Feb. 10, 1987

[30] Foreign Application Priority Data

Feb. 12, 1986 [DE] Fed. Rep. of Germany ....... 3604350

[51] Int. Cl.$^4$ .............................................. B01D 11/04
[52] U.S. Cl. ..................... 423/181; 210/638; 210/665; 210/669; 423/184; 423/499
[58] Field of Search ............... 210/634, 638, 663, 665, 210/669, 681, 682, 710; 423/181, 182, 184, 197, 499

[56] References Cited

U.S. PATENT DOCUMENTS 2,925,323  2/1960  Rimshaw .......................... 423/181
4,447,406  5/1984  Mein ................................. 423/184

OTHER PUBLICATIONS

Gmelin-Institut: Gmelins Handbuch der Anorganischen Chemie, 25:8, 1938 (pp. 140 and 168).
Chemical Abstracts 92:173665y (1980).
Chemical Abstracts 66:16954n (1967).

Primary Examiner—Ivars Cintins
Attorney, Agent, or Firm—Finnegan, Henderson, Farabow, Garrett and Dunner

[57] ABSTRACT

Cesium chloride is recovered from used density gradient solutions by extraction of lipophilic and coloring components using a lipophilic solvent, subsequent extraction with a polar protic organic solvent, adding perchlorate ions to the extraction residue, and converting the precipitated cesium perchlorate into cesium chloride.

9 Claims, No Drawings

RECOVERY OF CESIUM CHLORIDE FROM CONTAMINATED SOLUTIONS

Cesium chloride density gradients are used in biotechnology for separating DNA and RNA. The virtually saturated CsCl solutions which remain and which usually contain more than 1 g of CsCl/ml of solution have to date generally been discarded, since they usually contain inorganic contaminants, mainly magnesium chloride and sodium chloride, besides organic contaminants such as saccharose, tris HCL buffer, ethidium bromide, EDTA, cell fragments, DNA, RNA and proteins. Whereas the organic contaminants can be removed more or less completely by means of oxidative decomposition, for example by calcination, no process is known which reliably removes both the organic and the inorganic contaminants, so that the cesium chloride can be recovered in the necessary high purity. In spite of the high price, the cesium chloride-containing solutions have therefore hitherto been discarded, which involves additional disposal costs.

It has now been found that cesium chloride of the necessary high purity can be recovered from the solutions mentioned when these solutions are extracted with an organic solvent, preferably, initially with a lipophilic organic solvent and subsequently with a polar protic organic solvent, the cesium is precipitated from the extraction residue as the perchlorate, and the cesium perchlorate is then converted into cesium chloride.

Further preferred embodiments of the invention are described below in greater detail or are defined in the patent claims.

Of course, the type and quantity of the contaminants depends on the starting material. Since residues from several or many gradient separations will advantageously be worked up, a very complex system is generally present.

It may therefore be necessary to determine the extraction conditions by means of simple preliminary experiments.

Lipophilic solvents, for example hydrocarbons such as petroleum either or toluene, preferably moderately polar lipophilic solvents such as halogenated hydrocarbons, ethers or esters, are suitable for the extraction of the lipophilic and colored components. Suitable halogenated hydrocarbons are, above all, low molecular weight chlorinated aliphatics, such as dichloromethane, trichloromethane, tetrachloromethane, trichloroethylene and tetrachloroethylene. The lower aliphatic ethers, such as diethyl ether, methyl ethyl ether or dibutyl ether, are suitable as ethers and aliphatic esters derived from lower alkanols and lower fatty acids, such as methyl, ethyl or butyl acetate are suitable as esters and also, as appropriate, mixtures of several solvents from the same or different groups mentioned. In general, a single extraction with the lipophilic solvent is sufficient, but, of course, this does not exclude carrying out this extraction in several stages.

The alcohols which are not water-miscible to an unlimited extent, that is to say, above all, alkanols having at least 4 to about 8 carbon atoms, are primarily suitable as polar protic organic solvent. This extraction can also be carried out in one or several stages. A double extraction using a butanol, preferably n-butanol, is advantageous.

The aqueous extraction residue is now treated with perchlorate ions. In order to reduce the production of salts, the perchlorate ions are advantageously added in the form of perchloric acid, for example as 70% strength aqueous perchloric acid. The perchlorate ions are expediently not added in one batch, but in several portions or, particularly advantageously, gradually, on a small scale, for example, by slow or constant dropwise addition. The completeness of the precipitation can be recognized by no further cloudiness forming with a slight excess of perchlorate ions after brief settling of the precipitate.

The cesium perchlorate is produced in well crystalline, colorless form which can easily be separated off. The salt can be dried, for example, at about 50° to 70° C. in vacuo, or alternatively further processed immediately after washing with ice water and alcohol and filtering with suction to dryness.

The cesium perchlorate can be converted into cesium chloride by heating to temperatures above 240° C. Since this reaction proceeds exothermically, attention should be paid, if appropriate, to appropriate temperature control - depending on the batch size and the apparatus available.

The perchlorate can alternatively be converted into the chloride with the aid of ion exchangers, which makes possible the recovery of the perchlorate ion. The eluate obtained during the regeneration, either as perchloric acid solution or sodium perchlorate solution, can then, if appropriate after concentration, be re-employed for the precipitation. Suitable ion exchangers here are all commercially available anion exchangers in the chloride form. In addition to solid ion exchangers, liquid ion exchangers are also employed, the latter dissolved in an organic solvent which is sparingly soluble in water, such as an optionally halogenated hydrocarbon, for example toluene, an ester, such as ethyl or butyl acetate, an ether, such as diethyl or di-tert.-butyl ether, or a ketone, such as methyl isobutyl ketone. The ion exchange reaction and the regeneration of the exchanger are carried out in a fashion which is known per se or according to the manufacturers' instructions.

The cesium chloride is isolated from the eluates of the ion exchange reaction by evaporation. The crystalline residue dissolves in water to form a clear solution and is free of sodium ions. If the starting material contains potassium ions, which is usually not the case, the product contains potassium chloride. However, small amounts of potassium chloride do not interfere with the use of the product for density gradient separations.

The yield of cesium chloride, relative to cesium perchlorate, is greater than 90%. Since an exact determination of the cesium chloride content in the starting solutions is difficult in the presence of undefined proportions of saccharose, the overall yield can only be estimated. However, since the precipitation as perchlorate proceeds virtually quantitatively, the overall yields are in the order of 90%. The process according to the invention thus permits simple and inexpensive regeneration of the cesium chloride from used density gradient solution.

The invention is described in greater detail in the following examples. Percentage data here refer to the weight.

EXAMPLE 1

Aqueous cesium chloride waste solution is extracted once with ethyl acetate and twice with n-butanol in order to remove lipophilic and colored components. The aqueous phase is then treated, with stirring, dropwise with 70% strength aqueous perchloric acid solution until cesium perchlorate precipitation is complete. The mixture is stirred for about a further 30 minutes at room temperature and about 1 hour on an ice bath, the precipitate is filtered off under suction, washed twice with a little ice water and then several times with ethanol in a suction filtration apparatus. The colorless, well crystalline cesium perchlorate is dried at 50° to 70° C. in a vacuum drying cabinet.

A 20% strength aqueous sodium perchlorate solution can alternatively be added dropwise in place of the perchloric acid solution. In this case, the collected precipitate is digested in warm water, and the suspension is then stirred on an ice bath for about 1 hour, filtered off under suction, and treated further as described above.

It is also possible to employ the cesium perchlorate for the further processing directly after filtering with suction to dryness.

1 kg of cesium perchlorate is obtained per liter of waste solution by means of precipitation with about 450 ml of 70% strength perchloric acid.

EXAMPLE 2

70 g (0.3 mol) of finely ground cesium perchlorate are suspended in 300 ml of water. 0.5 mol equivalent of a strongly basic ion exchanger in the chloride form (400 ml of ®AMBERLITE IRA 410, trademark of the Rohm & haas Company, gel type, based on styrene/divinylbenzene, funtionality: quaternary ammonium; 16–50 wet mesh) is added and the mixture is stirred until the cesium perchlorate has dissolved completely, which takes about 2½ to 4 hours depending on the stirring speed. After filtering off under suction, the ion exchanger is washed thoroughly with 2×100 ml of water, and the solution is transferred to a column (diameter 8–10 cm) with a further 300 ml of the exchanger. After about 15 minutes, the product is eluted dropwise over the course of 3 to 4 hours and the column washed with water, and the aqueous phase is concentrated to dryness. The crystalline residue is taken up in about 200 ml of ethanol, filtered off under suction, and dried at 80° to 100° C. in a vacuum drying cabinet. 47.05 g, corresponding to 93%, of cesium chloride having a water content of about 0.6% are obtained. The product dissolves in water to form a clear solution and is free of sodium ions.

For regeneration, the entire ion exchanger is washed on the column used with 0.5 liters of 2N sodium hydroxide solution, about 2 liters of water, 2×0.5 liters of 2N hydrochloric acid and with water until neutral reaction is achieved.

EXAMPLE 3

23.2 g (0.1 mol) of cesium perchlorate are suspended in 80 ml of water. A solution of 0.15 mol equivalent of a liquid basic ion exchanger in the chloride form (AMBERLITE LA-2, high molecular weight, water-insoluble, oil-soluble, type: secondary amine; 75 ml, dissolved in 225 ml of methyl isobutyl ketone) is added and the mixture is stirred vigorously until the cesium perchlorate dissolves completely, which requires about 45 minutes. After phase separation, the aqueous phase is stirred for a further 20 to 30 minutes with the solution of 0.15 mol equivalent of the same exchanger. After separating the phases again, the combined aqueous phase is extracted once with ethyl acetate and concentrated to dryness, and the crystalline residue is taken up in ethanol, filtered off under suction, and dried at 80° to 100° C. in a vacuum drying cabinet. 15.65 g, corresponding to 93%, of cesium chloride which dissolves in water to form a clear solution are obtained.

The ion exchanger is regenerated by vigorous shaking with 0.2 liter of 2N sodium hydroxide solution (about 5 minutes), shaking twice with water, stirring vigorously three times for 10 minutes each with 80 ml of 2N hydrochloric acid in each case, and washing with water until neutral.

EXAMPLE 4

The dissolution of the perchlorate and the removal of dissolved perchlorate traces can also be combined by initially treating, as described in example 3, with 1.5 mol equivalents of the liquid, dissolved ion exchanger in the aqueous-organic 2-phase system until a clear aqueous phase is produced. After phase separation and extraction with ethyl acetate, the water phase is passed through a column containing 0.5–1 mol equivalent of the solid ion exchanger, as described in example 2. Yield and purity of the product correspond to the data in examples 2 and 3.

What is claimed is:

1. A process for the recovery of cesium chloride from a used density gradient aqueous solution which comprises contacting said aqueous solution with an organic solvent to extract contaminants from said solution, adding a source of perchlorate ions to the remaining extracted aqueous solution to precipitate cesium ions therefrom as cesium perchlorate, and converting the cesium perchlorate into cesium chloride.

2. The process as claimed in claim 1, wherein the solution is initially contacted with a lipophilic solvent and subsequently with a polar protic organic solvent.

3. The process as claimed in claim 2, wherein the lipophilic solvent is a halogenated hydrocarbon, an ether or an ester.

4. The process as claimed in claim 3, wherein the lipophilic solvent is dichloromethane, trichloromethane, tetrachloromethane, trichlorethylene, tetrachloroethylene, diethyl ether, methyl ethyl ether, dibutyl ether, methyl, ethyl or butyl acetate, or a mixture of these solvents.

5. The process as claimed in claim 2, wherein the polar protic solvent is an alkanol having 4 to 8 carbon atoms.

6. The process as claimed in claim 1, wherein the source of perchlorate ions is perchloric acid.

7. The process as claimed in claim 1, wherein the conversion into cesium chloride is a thermal decomposition.

8. The process as claimed in claim 1, wherein the conversion into cesium chloride is effected by ion exchange.

9. The process as claimed in claim 8, wherein the ion exchange process is carried out in a liquid/liquid and/or in a solid/liquid two-phase system.

* * * * *